United States Patent [19]
Schlicke
[11] 3,842,374
[45] Oct. 15, 1974

[54] FEEDTHROUGH FILTER WITH NON-LINEAR RESISTIVE DIELECTRIC

[75] Inventor: Heinz M. Schlicke, Fox Point, Wis.

[73] Assignee: Allen-Bradley Company, Milwaukee, Wis.

[22] Filed: Mar. 9, 1973

[21] Appl. No.: 339,569

[52] U.S. Cl. .................................... 333/79, 317/256
[51] Int. Cl. .............................................. H03h 7/14
[58] Field of Search .......... 333/70 CR, 79; 317/256, 317/258

[56] References Cited

UNITED STATES PATENTS

| | | | |
|---|---|---|---|
| 2,841,508 | 7/1958 | Roup et al. | 317/258 X |
| 2,983,855 | 5/1961 | Schlicke | 317/256 X |
| 3,268,744 | 8/1966 | Kaiser et al. | 317/256 X |
| 3,329,911 | 7/1967 | Schlicke et al. | 333/79 |
| 3,496,433 | 2/1970 | Siegrist | 317/258 |
| 3,666,505 | 5/1972 | Hoffman et al. | 317/258 X |

*Primary Examiner*—Paul L. Gensler
*Attorney, Agent, or Firm*—Quarles & Brady

[57] ABSTRACT

Feedthrough filters for bypassing high frequency interference signals away from a conductor carrying low frequency or direct current energy are shown. These filters employ a metal oxide type of varistor material as a dielectric between capacitor electrodes with a high dielectric constant $\epsilon$, and the non-linearity of current flow through the varistor material with respect to applied voltage varies by such an exponential factor that the filter functions in usual manner as a high frequency bypass for low energy interference, but as an ohmic current bypass for high energy interference regardless of frequency.

5 Claims, 6 Drawing Figures

PATENTED OCT 15 1974 3,842,374

SHEET 2 OF 2

FEEDTHROUGH FILTER WITH NON-LINEAR RESISTIVE DIELECTRIC

BACKGROUND OF THE INVENTION

This invention relates primarily to feedthrough filters for shunting high frequency energy from a conductor carrying direct current or low frequency power into or from an electrically shielded region.

Feedthrough filters are commonly mounted at the point of passage of a conductor through a shielding enclosure. High frequency energy that may appear as interference on the feedthrough line of the filter is bypassed through the capacitor portion of the filter to the shielding. Such high frequency energy is typically electromagnetically induced onto the direct current or low frequency feedthrough line, and resides in the ultra and very high frequency ranges extending into values of many mega-Hertz. The capacitor dielectrics of the filters are of a high dielectric constant material, usually a titanate, in order to obtain adequate capacitance within a small volume. Resonant conditions occur within these dielectric bodies at the freguencies where the dielectric body is of a dimension corresponding to a half wave length. The dielectric becomes a small resonant cavity, and resonance drastically reduces the effectiveness of the bypass, or shunting, of the interference frequencies. A number of constructions for deresonating these devices have been developed, of which my patents, U.S. Pat. Nos. 2,973,490; 2,983,855; 2,994,048; 3,007,121; 3,023,383; 3,035,237 and 3,329,911 are illustrative, and they show a state of the art.

In prior filters the electromagnetically induced high frequencies have been at low energy levels of lesser voltages than those for the useful currents being fed through the devices. However, if the interference voltages traveling along the feedthrough line present higher transient voltages which may be destructive of the equipment with which a filter is associated, then use of prior type deresonated filters is inadequate. This is also true whether the high voltage interference signals be of high or low frequency, and some new mechanism is needed to protect a filter and associated equipment from large, transient interference voltages.

Large interference voltages may appear from switching inductive devices in the circuit of which the filter is a part, or they may be induced from natural phenomena such as lightning. Whatever the cause, these high voltages are normally a transient, or surge, and may appear as sharp spikes composed of a power spectrum spread from zero frequency to the order of kilo- or mega-Hertz values. If conventional feedthrough filters with titanate dielectrics were designed for handling large transient voltages without failure they would be of such large size as to be impractical. It is the modification of feedthrough filters for the purpose of effectively clipping, or bypassing such large voltages, in addition to the usual bypassing of low energy electromagnetic interferences, to which this invention is directed.

SUMMARY OF THE INVENTION

The present invention resides in a filter having a feedthrough lead, a varistor material with a large dielectric constant encircling the feedthrough lead, opposing electrodes on the varistor material, and connections between the feedthrough lead and the electrodes for shunting large transient voltages away from the lead.

The invention incorporates into a feedthrough filter a material that presents a high dielectric strength in the presence of low signal strength electromagnetic induced interference, but which has the additional characteristic in the presence of high voltages of becoming a resistance that conducts significant ohmic current. The higher voltages thus cause current to flow through this dielectric material of the filter to clip off or reduce the peak voltage values, thereby safeguarding equipment to which the feedthrough lead of the filter is connected.

It has been found that varistor materials of the metal oxides are characterized by a high dielectric constant and are suitable as capacitor dielectrics for filter applications in much the same manner as the titanates. They can be dimensioned to the same small sizes, and they are subject to similar resonances as titanates, for wave lengths within bodies of this material are also foreshortened by the same principal of the speed of propagation within a body being dependent upon the dielectric constant of the medium. Hence, resonance will occur in metal oxides, and measures to overcome it can be adopted similarly as in my aforesaid patents. The contemplated metal oxides are basically a zinc oxide with added minor amounts of other oxides, such as beryllium oxide, bismuth oxide, lanthanum oxide, yttrium oxide, cobalt oxide, etc. The chemistry and manner of preparation of these varistor materials has been investigated and published in considerable detail in U.S. Pat. Nos. 3,496,512; 3,570,002; 3,598,763; 3,632,528; 3,632,529; 3,634,337; 3,642,664; 3,658,725; 3,663,458; 3,687,871; 3,689,863; 3,670,216 and 3,670,221. The formulations and manner of forming zinc oxide mixes consequently are not deemed a part of the present invention.

The term varistor commonly means a variable resistance varying non-linearly with voltage, such that for smaller voltage values the resistance is very large and for voltages above some threshold range the resistance becomes greatly reduced. For the present invention the resistance for voltages below the threshold range should be extremely large, so that current drain is negligible and the material approaches the characteristic of a high $\epsilon$ dielectric like the titanates. Hence, the varistor concept of having some current drain in the presence of low voltages is inapplicable here.

The zinc oxides have good qualities for approaching zero current drain when functioning as a capacitor. The current to voltage relationship for a body of the material is given as:

$$I = KV^{\alpha}$$

wherein $K$ is a constant affected by the body dimensions, and the exponent alpha varies with the formulation and processing of the varistor material. For zinc oxide, alpha can range from low values of about 5 up to values of 40, or possibly more. The larger the value of alpha the lower the current drain will be at the lower voltages. Hence, a large alpha is desirable. The alpha values for zinc oxide compare favorably with other varistor materials such as silicon carbide ($\alpha = 5$), selenium ($\alpha = 8$) and silicon power zeners ($\alpha = 35$). This high alpha characteristic of the metal oxides, and the application of these oxides as protecting devices which exhibit low resistance in the presence of high voltages, such as overloads, and large resistance at other times which minimizes stand-by current drain, is described and illustrated in U.S. Pat. Nos. 3,710,058; 3,710,061 and 3,710, 187, and also in the publication "GE-MOV Varistors-Voltage Transient Suppressors" by General Electric Company in December 1971. This publication further recognizes low capacitive values of discs of zinc oxide with metal plates on opposite sides.

In addition to providing high voltage protection for filters, the metal oxide dielectric materials as used in this invention have been found to exhibit additional highly advantageous characteristics for filters heretofore not available in other high dielectric constant materials. The value of the dielectric constants of titanate materials decrease markedly in the presence of low or high temperatures such as from −55° C. and 125° C. Variations for zinc oxides over a similar temperature range are slight or nearly insignificant.

The dielectric constant $\epsilon$ of zinc oxide is not as sensitive to applied voltages. For titanates, low frequency bias voltages on a feedthrough lead may decrease $\epsilon$, but it has been found that zinc oxide is not adversely affected in this manner. Also, the value of $\epsilon$ for zinc oxide is stable with frequency change, so that it is quite ideal as a capacitor dielectric material.

It is an object of the invention to provide a feedthrough filter with a high dielectric constant that also conducts ohmic current in the presence of larger voltages, to thereby bypass higher energy levels of interference away from equipment with which the filter is associated. A further object is to provide a dialectric for filters that is stable in dielectric value with variations in temperature, frequency and bias voltages.

The foregoing and other objects and advantages of the invention will appear from the following description. In the description reference is made to the accompanying drawings which form a part hereof, and in which there is shown by way of illustration and not of limitation several preferred embodiments of the invention. Such embodiments do not represent the full scope of the invention, but rather the invention may be employed in many different embodiments, and reference is made to the claims herein for interpreting the breadth of the invention.

DESCRIPTION OF PREFERRED EMBODIMENTS

Figure 1:
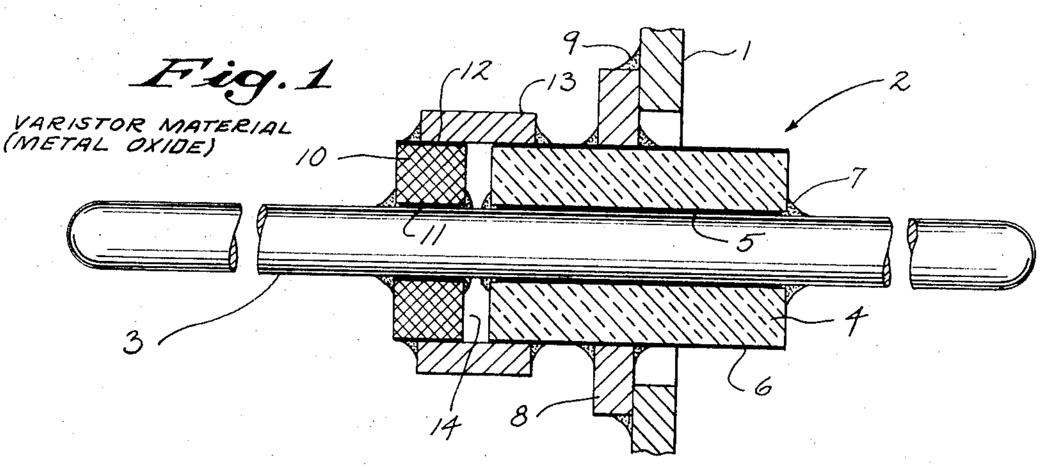
FIG. 1 is a view in cross section on an enlarged scale of a tubular form of feedthrough filter embodying the present invention.

Referring first to FIG. 1, there is shown a portion of a metal chassis wall 1 which may be part of a shielding enclosing some form of circuit. It is typical that circuits be fully shielded to prohibit ultra and very high frequencies that may occur in and around the circuit from leaking away from the vicinity of the circuit, or conversely for the purpose of shielding the circuit from ultra and very high frequencies that are at play outside the circiut. Low frequency and direct currents are commonly conducted through the shielding and at the point of emergence through the shielding feedthrough filters are employed to bypass or shunt these ultra and very high frequencies to the shielding wall. In FIG. 1 a feedthrough filter 2 of tubular form has a feedthrough lead 3 that is encircled by a first tubular dielectric body 4. This dielectric body 4 is like that of prior constructions, as exemplified in some of my foregoing cited United States patents, in which small tubes of high dielectric constant $\epsilon$ material in the form of a titanate provides a dielectric body for a capacitor element. This dielectric body 4 has an inner electrode 5 and an outer electrode 6 which are of silver paste fired in situ, and the inner electrode 5 is in electrical contact with the feedthrough lead 3 by virtue of solder connections 7. Surrounding and soldered to the outer electrode 6 is a mounting ring 8, and the mounting ring 8 forms a means for connecting to the chassis wall 1 through an additional solder connection 9.

The construction described to this point can be deemed like that of prior tubular feedthrough filters, with the purpose being to conduct low frequency currents along the feedthrough lead 3 without power loss, and to shunt, or bypass, ultra and very high frequencies that may appear on the feedthrough lead 3, by reason of electromagnetic induction or otherwise, through the capacitor element formed of dielectric body 4 and electrodes 5, 6 to the chassis wall 1. A highpass filter is thus provided from the feedthrough lead 3 to the chassis wall 1. Such a filter device will typically resonate at some frequencies above 100 mega-Hertz, and some means must be introduced for deresonating the dielectric body 4 and its electrodes 5, 6. One measure is to introduce ohmic resistance into the outer electrode 6, or some other means of deresonating may be adopted as taught in my aforesaid patents. To this point in the description, there is no material departure from prior art practices.

The filtering in prior devices is for shunting low voltage, or low energy interference in the ultra and very high frequency ranges. For interference voltages of much higher levels, which exceed the ratings of the filter, destruction of the device may occur. It is thus desirable to incorporate some means of shunting, or bypassing higher interference voltages regardless of frequency. For example, a filter may be rated for 30 volts along the feedthrough lead, and if much larger interference voltages appear upon the feedthrough lead 3 protection is no longer afforded by the filter. An abrupt transient, of let's say 100 volts, might appear as a sharp spike on the lead 3, and this transient will have a power spectrum from zero frequency up to a very high frequency value. It would be desirable to protect the circuit within the chassis wall 1 from this abrupt transient, and the remaining construction in FIG. 1 is provided for this purpose.

A short tube 10 of a metal oxide encircles the feedthrough lead 3 at a position immediately adjacent an end of the dielectric body 4. An inner electrode 11 on the tube 10 is solder connected to the feedthrough lead 3, and an outer electrode 12 is disposed on the outside surface of the tube 10 in capacitive relation to the inner electrode 11. A conductive band 13 fits snugly about the electrode 12 and also overlaps an end of the electrode 6 with a similar snug fit. The conductive band 13 is solder connected to both the electrodes 6 and 12 to form a circular conductive bridge between them.

The short tube 10 with the electrodes 11 and 12 forms a bypass capacitor segment similar to the capacitor of the dielectric body 4, and may be deemed a continuation thereof. Thus, the short tube 10 should exhibit a satisfactory dielectric constant ε. The second function of the short tube 10 is to become conductive of ohmic currents upon the appearance of interference voltages in excess of the rated voltages for the filter device. By becoming conductive, large transient interference voltages, regardless of frequency, are clipped by immediate conduction from the lead 3 to the chassis wall 1.

A varistor type material is utilized as the dielectric for the short tube 10, and the metal oxides that are formed predominantly of zinc oxide with additives, as mentioned hereinabove, have been found as a preferred material. They exhibit the characteristic of a high dielectric constant for the usual shunting of high frequency, low voltage interference through a feedthrough filter, and superimposed upon this characteristic is a low resistance ohmic conduction in the presence of high voltage interference.

By providing a first dielectric body 4 and a second dielectric body 10 in electrical parallel relationship the length of the body 4 may be reduced from that which would otherwise be required for adequate filtering of low energy ultra and very high frequencies in the absence of the body 10. A foreshortening of the body 4 may effectively deresonate this body in the intended frequency spectrum of operation. The gap 14 that appears between the bodies 4 and 10 effectively breaks up the physical body length to achieve this deresonation, and this means of deresonating may be in addition to the resistance of the electrode 6. If desired, a ferrite magnetic body might be disposed in the gap 14 to further deresonate the device, and also the gap may be filled with an epoxy or similar material to increase strength.

Figure 2:
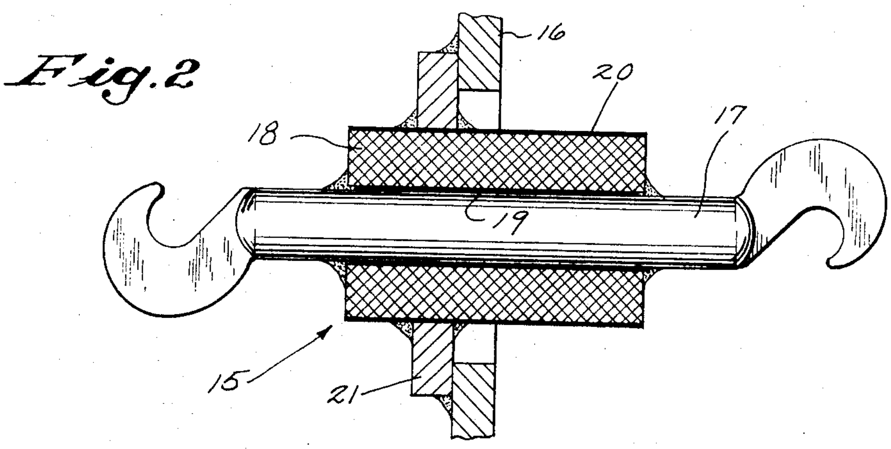
FIG. 2 is a view in cross section on an enlarged scale of another tubular form of feedthrough filter embodying a varistor material.

A second form of filter, utilizing a varistor material as the sole dielectric, is shown in FIG. 2. A feedthrough filter 15 extends through a chassis wall 16, such filter 15, having a feedthrough lead 17 encircled by a tubular dielectric body 18. This dielectric body 18 is composed wholly of a metal oxide, that is predominantly zinc oxide, and on the inside surface of the tube there is an electrode 19 solder connected to the lead 17. On the outside surface there is a second electrode 20, and a mounting ring 21 encircles the electrode 20 and provides a means for connection to the chassis wall 16. The physical appearance of this filter 15 is quite similar to that in FIG. 1 of my U.S. Pat. No. 3,007,121.

Figure 5:
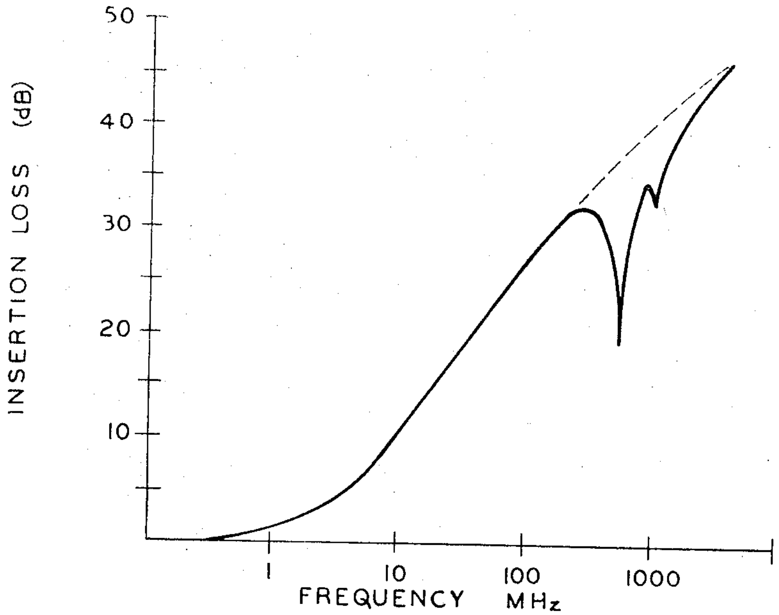
FIG. 5 is a graph of the insertion loss of a feedthrough filter such as shown in FIG. 2.

The zinc oxide varistor material is formulated to provide a high dielectric constant ε, and for purposes of this invention a high dielectric constant material is one having an ε of 1,000 or more. The solid line of FIG. 5 is a curve showing the insertion loss in decibels against frequency for the filter 15 of FIG. 2 when used to filter low energy interference. By insertion loss is meant the decrease in the interference signal from one end of the feedthrough lead 17 to the other end by reason of the shunting of the signal through the frequency responsive capacitor portion. The curve in FIG. 5 is that which is obtained without deresonation of the capacitor portion, and there is an initial resonance at about 500 mega-Hertz and a first harmonic resonance at about 1,000 mega-Hertz. For the example of FIG. 5, the tubular dielectric body had a length of five millimeters and a dielectric constant ε of 3,600. By calculation, the first resonance point should be at the value of 500 mega-Hertz, and hence the test of this device indicates that a zinc oxide varistor material in the presence of low energy interference functions as other dielectrics which have heretofore been used in feedthrough filters.

The resonant points of FIG. 5 are, or course, removed from final filter construction by incorporating some means of deresonating. A satisfactory means would be the introduction of electrical resistance into the outer electrode 20. This can be accomplished by adding more glass into the silver paste of the electrode 20, and the resistance value can be made to match the characteristic impedance of a transmission line equivalent to the dielectric body 18. Or, the final resistance may be of the order of about one ohm. Other means of deresonation may also be incorporated, and the final curve will follow the dotted line of FIG. 5.

Figures 3, 4:
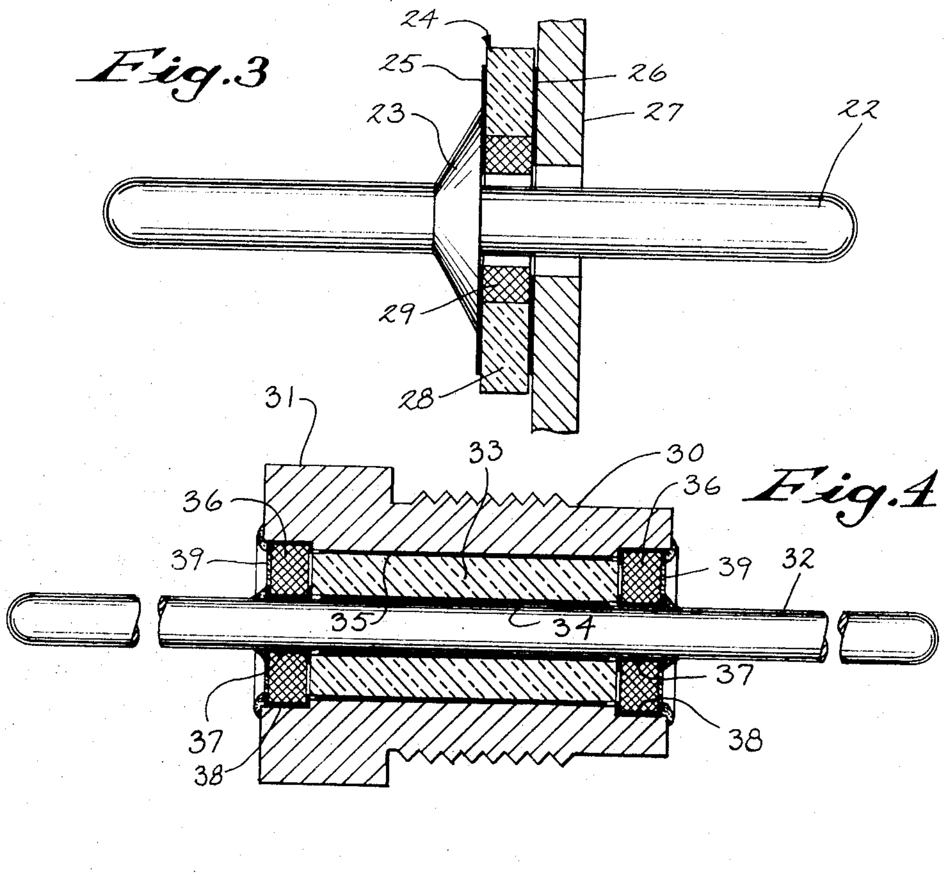
FIG. 3 is a view in cross section on an enlarged scale of a feedthrough filter embodying the invention in which the capacitor element is of discoidal configuration.
FIG. 4 is a view in cross section on an enlarged scale of a hermetically sealed feedthrough filter embodying the invention.

FIG. 3 illustrates a discoidal form for the invention. A feedthrough lead 22 has an upstanding cone 23 formed as an integral part thereof. An open center, disc shaped dielectric body 24 encircling the lead 22 has a first electrode 25 attached to the cone 23, and a second electrode 26 is attached to a chassis wall 27. The disc shaped dielectric body 24 has a first portion 28 made of high dielectric constant titanate, and a second portion 29 of a varistor material such as a zinc oxide that also has a comparable high dielectric constant. These two portions abut one another to form a unitary dielectric body 24.

Referring now to FIG. 4, there is shown a hermetically sealed filter within a hollow metallic housing 30 that is threaded along a major portion of its outside surface, and which has a hexagonal head 31 at one end. A feedthrough lead 32 extends through the body, and a concentric dielectric body 33 with electrodes 34 and 35 fit snugly within the housing 30. The lead 32 electrically connects with the inner electrode 34, and the outer electrode 35 connects with the housing 30.

At both ends of the housing 30 there is a varistor type dielectric 36, which again is preferably of a zinc oxide, upon which there is affixed electrodes 37 and 38. The inner electrodes 37 are soldered to the feedthrough lead 32, and the outer electrodes 38 are soldered to the housing 30. By this construction the unit becomes hermetically sealed, and to enhance the hermetic seal the outer surfaces 39 of the varistor dielectric bodies 36 may be glazed with glass to make the construction more impervious.

Figure 6:
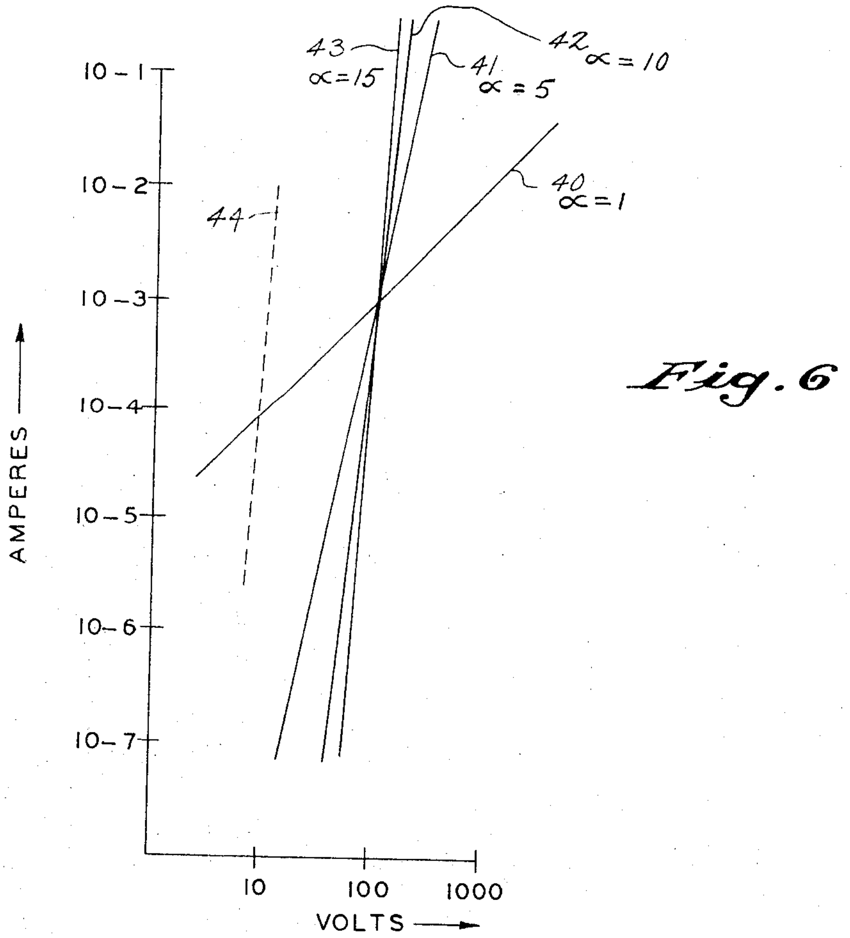
FIG. 6 is a graph with log-log co-ordinates illustrating the voltage-current relationship of filters in which the invention may be embodied.

Referring now to the graph of FIG. 6, illustrative voltage-current relationships are shown on log-log scales for varistor materials of different values of alpha in the relationship $I = KV^{\alpha}$. For the ranges of current shown in the graph the value of alpha of a particular capacitor will remain constant, and for the purposes of discussion and illustration a number of lines pass through the point of 1 milliampere of current for 100 applied volts. In the instance of a resistor, alpha is unity and $K$ becomes the reciprocal of the resistance value. For each increment in voltage there is a like increment in current, and on log-log coordinates a line for alphs = 1 will have a 45° slope. The line 40 represents a resistor, and to conduct 1 milliampere at 100 volts the resistance must be 100,000 ohms.

As alpha increases the lines in FIG. 6 become steeper, as illustrated by lines 41, 42 and 43 which are alpha = 5, 10 and 15 respectively. It is apparent that for a substantial alpha current falls off very sharply with decreasing voltage. Thus, if it is desired to provide a feedthrough filter that is rated for 50 volts for normal power conduction along its feedthrough lead, and to clip off larger interference voltages such that at 100 volts one milliampere of ohmic current is bypassed through the capacitor of a filter, then for an alpha of ten at the rated voltage of 50 less than a microampere will be drawn. For an alpha of 15 the current at 50 volts drops to about 1/100 of a microampere. Also, it is seen that for interference voltages above 100 the ohmic current rises sharply, so that for large voltage spikes adequate clipping, or shunting is available. The electrodes should be made adequate for the currents anticipated, to alleviate injury to the filter.

For practice of the invention alpha should be at least 10, and the higher values are preferable, for the reason there is lower ohmic current drain below the selected threshold voltage, and above the threshold voltage resistance decreases much more rapidly with increasing voltage. As a result the threshold voltage for clipping can be brought closer to the filter rated voltage when the higher alpha values are utilized. With alpha at a value of at least 10 the selected threshold voltage for clipping can be brought adequately close to filter rated voltage for high voltage protection for many applications.

The illustrative figures of 100 volts, as a threshold clipping voltage and 1 milliampere at this voltage, are fairly representative of parameters for actual filters. At these values, an alpha of 10 calls for $K = 10^{-14}$ and an alpha of 15 calls for $K = 10^{-19}$. Thus the constant $K$ is very small and a range for the invention can be said to be about $10^{-14}$ and smaller.

The operating lines of FIG. 6 can be shifted to obtain different operating parameters. For example, it may be desired to design a filter for conducting a milliampere at 10 volts with a varistor material having an alpha of 15, so as to have an operating curve as represented by the dashed line 44 in FIG. 6. The dimensioning of the dielectric body is selected to obtain the desired operating characteristics.

It is a discovery that zinc oxide materials, in particular, can be physically proportioned to meet filter design requirements for both (i) the usual shunting of low voltage electromagnetic interference in the ultra and very high frequency ranges, and (ii) for overload protection from higher voltages at all frequencies. The invention provides a feedthrough filter having a dielectric that is capacitive in character at rated voltage values, to function in a normal filtering mode, but which becomes resistive at some selected voltage above rated values to conduct significant ohmic current and to thereby provide increased protection from surges and pulses of unusually large voltages.

I claim:

1. In a filter the combination comprising:
- a feedthrough lead;
- a dielectric encircling said lead having a first portion comprised of a titanate and a second portion comprised of a metal oxide varistor material with a high dielectric constant;
- an electrode on one face of each of the dielectric portions in electrical connection with said feedthrough lead; and
- a second electrode on an opposite face of each of said dielectric portions adapted for connection to a conductor in shunt relation to the feedthrough lead.

2. In a feedthrough filter the combination comprising:
- a hollow metallic housing open at opposite ends;
- a feedthrough lead extending through the housing;
- a tubular dielectric surrounding the lead and disposed within said housing;
- a first electrode on the inside of the dielectric in electrical contact with said lead;
- a second electrode on the outside of said dielectric in electrical contact with said housing;
- a body of varistor material enclosing each end of said housing, bridging the space between said lead and the opening wall of said housing; and
- a pair of electrodes on each varistor body, one electrode connected with said lead and the other with said housing.

3. A filter as in claim 2 wherein the bodies of varistor material are coated with a glaze.

4. In a filter for shunting very high frequency energy in the mega-hertz range from a conducting lead to a shielding enclosure, or the like, the combination with such lead of:
- terminal means for attachment to a shielding enclosure;
- a dielectric having a high dielectric constant electrically interposed between said conducting lead and said terminal means to present a capacitive shunting path between said lead and said terminal means;
- a high dielectric constant varistor material adjacent said dielectric in electrical parallel relationship thereto to establish an ohmic path between said lead and said terminal means; and
- electrodes in electrical contact with said dielectric and said varistor material for establishing said paths through said dielectric and said varistor material.

5. A filter as in claim 4, in which the varistor material has a current conduction characteristic of $I = KV^{\alpha}$ in which the value of the exponent alpha is ten or more, and has a dielectric constant of one thousand or more.

* * * * *